United States Patent [19]

Yoshida et al.

[11] 4,055,624
[45] Oct. 25, 1977

[54] PROCESS FOR REMOVING NITROGEN OXIDES FROM GASEOUS MIXTURES

[75] Inventors: Hiroyuki Yoshida; Katumi Saga, both of Koriyama, Japan

[73] Assignee: Hodogaya Chemical Co., Ltd.

[21] Appl. No.: 724,974

[22] Filed: Sept. 20, 1976

Related U.S. Application Data

[63] Continuation of Ser. No. 510,800, Sept. 30, 1974, abandoned.

[30] Foreign Application Priority Data

Oct. 3, 1973    Japan .................... 48-110437

[51] Int. Cl.$^2$ ............................................. C01B 21/00
[52] U.S. Cl. ...................................... 423/235; 423/351
[58] Field of Search ................... 423/235, 239, 351

[56] References Cited

U.S. PATENT DOCUMENTS

| | | | |
|---|---|---|---|
| 3,023,076 | 2/1962 | Karwat | 423/235 |
| 3,149,907 | 9/1964 | Karwat | 423/235 |
| 3,660,040 | 5/1972 | Harding et al. | 423/239 |
| 3,733,393 | 5/1973 | Couillaud et al. | 423/235 |
| 3,773,897 | 11/1973 | Fields et al. | 423/235 |

FOREIGN PATENT DOCUMENTS

| | | | |
|---|---|---|---|
| 594,137 | 1960 | Canada | 423/235 |
| 663,218 | 1951 | United Kingdom | 423/235 |
| 663,239 | 1951 | United Kingdom | 423/235 |
| 1,229,107 | 1971 | United Kingdom | 423/239 |

OTHER PUBLICATIONS

Chem. Abstr., vol. 64, 1966, 9282d.

*Primary Examiner*—Earl C. Thomas
*Assistant Examiner*—Eugene T. Wheelock
*Attorney, Agent, or Firm*—Miller & Prestia

[57] ABSTRACT

A process for removing nitrogen oxides including nitrogen monoxide from a gaseous mixture such as industrial waste gases is provided. The gaseous mixture is contacted, first, with an aqueous solution of a chlorate and, then, with water, an aqueous solution or dispersion of a basic compound or an aqueous alkaline solution or dispersion of a reducing agent.

7 Claims, No Drawings

PROCESS FOR REMOVING NITROGEN OXIDES FROM GASEOUS MIXTURES

This is a continuation, of application Ser. No. 510,800, filed Sept. 30, 1974, now abandoned.

This invention relates to a process for removing nitrogen oxides from a gaseous mixture, and more particularly to a process for removing nitrogen monoxide and nitrogen dioxide from waste gases containing such nitrogen oxides.

Various chemical treating and manufacturing processes, such as: a burning process, a nitric acid manufacturing process and a lead chamber sulfuric acid manufacturing process produce industrial waste gases that contain a small proportion of nitrogen oxides such as nitrogen monoxide and nitrogen dioxide. The removal of such nitrogen oxides from the atmosphere is essential to the proper control of air pollution.

Since nitrogen dioxide is soluble both in water and in an aqueous alkaline solution, it can be readily removed from waste gases. Thus, washing of waste gases with an aqueous alkaline solution is an effective method of removing nitrogen dioxide. In contrast, nitrogen monoxide possesses an extremely low solubility in water or in an aqueous alkaline solution. For example it is soluble only in an amount of approximately 0.004 g in 100 g of water at 50° C. Accordingly, it is difficult to reduce the content of nitrogen monoxide in waste gases to below 100 ppm.

Thus, for the removal of both nitrogen dioxide and nitrogen monoxide one method has proposed that a waste gas first be treated with air to oxide nitrogen monoxide into nitrogen dioxide, and then washed with water or an aqueous alkaline solution to absorb the nitrogen dioxide. However, conventional air oxidation processes are not advantageous in that the rate of oxidation for nitrogen monoxide is low. As the percentage content of nitrogen monoxide, present in the air decreases the rate of oxidation for that nitrogen monoxide will also decrease. For example, in order to oxidize 95% of the nitrogen monoxide present in the air by the oxygen contained in the air, approximately one hour is required when the initial content of nitrogen monoxide is 1,000 ppm. However approximately five hours are required to oxidize the nitrogen monoxide when the initial content of nitrogen monoxide is 200 ppm.

Other oxidation processes have been proposed wherein other oxidizing agents, such as hydrogen peroxide, potassium permanganate, or certain chlorites, are employed in substitution for air. However, these processes are not satisfactory. For example, hydrogen peroxide is both expensive and very high in weight per amount of oxygen because it is available usually as an aqueous solution of a 35% concentration. Potassium permanganate not only is expensive, but also raises a new problem. For example, manganese dioxide, produced by the reduction of the potassium permanganate, may cause environmental pollution when the absorbed liquid is disposed without recovery of manganese dioxide. The removal on manganese dioxide from the absorbed liquid requires still another time consuming step. Sodium chlorite and other chlorites require complicated equipment for their manufacture and therefore, are not advantageous because of economic considerations.

In order to enhance the rate of oxidation, the oxidation of nitrogen monoxide may be carried out in the presence of a catalyst such as silica gel, active carbon, or platinum. However, the catalyst life becomes considerably shortened particularly when a minor amount of water is present.

Therefore, it is an object of the present invention to provide a process for removing nitrogen oxides including nitrogen monoxide from waste gases that provides both an enhanced efficiency and a reduced cost.

It is another object of the present invention to provide a process for removing nitrogen oxides from waste gases, which does not produce a waste liquid that cause secondary environmental pollution.

Other objects and advantages will be apparent from the following description.

In accordance with the present invention, there is provided a process for removing nitrogen oxides from a gaseous mixture which comprises the steps of first contacting said gaseous mixture with an aqueous acid solution of a chlorate contacting the gas with a liquid selected from the group consisting of water, an aqueous solution or dispersion of a basic compound and an alkalified aqueous alkaline solution or dispersion of a reducing compound.

The gaseous mixture to be treated in accordance with the process disclosed by the present invention includes those which contain nitrogen monoxide, such as industrial waste gases produced in various chemical treating and manufacturing processes. Also the gaseous mixture may contain, besides nitrogen monoxide, other nitrogen compounds and sulfur compounds such as sulfur dioxide.

In the first step of the process of the invention, nitrogen monoxide present in the gaseous mixture is oxidized by the chlorate into nitrogen dioxide and the nitrogen dioxide is absorbed by the aqueous solution to be converted into nitrous acid, nitric acid or their salts. When the gaseous mixture also contains sulfur dioxide, the sulfur dioxide functions as a reducing agent in the presence of the chlorate and thus, at least a part of the nitrogen oxides present seems to be reduced to nitrogen. The sulfur dioxide is oxidized and absorbed by the aqueous solution so that it may later be recovered in the form of sulfuric acid. In the succeeding second step, nitrogen dioxide, at least a part of which has been converted from nitrogen monoxide, is absorbed by water or an aqueous alkaline solution.

The chlorate used is one of those which are soluble in water and includes, for example, sodium chlorate, potassium chlorate, ammonium chlorate, calcium chlorate and barium chlorate. Of these, sodium chlorate is advantageous from the standpoint that is less costly and more readily reacts with the gaseous mixture.

The chlorate is used in an aqueous acid solution containing a concentration within the range from 0.01 to 3% chlorate by weight. In order to made full use of the reagent, it should preferably be used at a concentration as low as possible within the above range. For repeated use, suitable amounts of chlorate are replenished in the treated liquid upon occasion, so as to maintain the level of concentration of the chlorate in the treated liquid within the stated range. The amount of chlorate to be added depends upon the change in concentrations of the chlorate in the treated liquid and the amount of nitrogen monoxide present in the waste gas. These concentrations are of course measured from time to time during the operation.

The aqueous acid chlorate solution is usually prepared by adding inorganic acids such as sulfuric acid, hydrochloric acid and nitric acid. These inorganic acids may be present at a concentration within the range from 1 to 80% by weight based on the weight of the aqueous chlorate solution, although the suitable concentration varies depending upon the particular acid added and the particular waste gas treated. Although the acid concentration in the treated liquid sometimes increases up to 70 to 80% by weight, particularly in the case where a waste gas contains sulfur dioxide, such a high concentration may be employed. The acid present in the aqueous chlorate solution aids the chlorate to oxidize nitrogen monoxide.

The aqueous acid chlorate solution may further contain 2 to 40 g/l of an alkali metal chloride such as, for example, sodium chloride and potassium chloride. The alkali metal chloride promotes the generation of chlorine dioxide and thus enhances the utility of the chlorate.

The treatment of the gaseous mixture with the acidified aqueous chlorate solution is usually carried out at a temperature within a range from room temperature to 80° C, preferably from 50° C to 60° C.

The gaseous mixture treated by the aqueous acid chlorate solution in the first step is then brought into contact with a liquid selected from the group consisting of water, an aqueous solution or dispersion of a basic compound, or an aqueous alkaline solution or dispersion of a reducing compound. The suitable treating liquid depends upon the composition of the gaseous mixture treated in the first step. When the gaseous mixture contains a mist of sulfuric acid, either waste or an aqueous solution or dispersion of a basic compound is preferably employed. The basic compounds which can be used include, for example, sodium hydroxide, potassium hydroxide, sodium carbonate, calcium carbonate, ammonia and calcium hydroxide. The concentration of these basic compounds is not critical, but may vary in general within a range of from 1 to 40 g/l.

When the gaseous mixture contains oxidizing gases such as chlorine dioxide, an aqueous alkaline solution or dispersion of a reducing agent is preferably employed in order to deactivate and absorb the oxidizing gases. Illustrative of the reducing agents that may be utilized are alkali sulfides such as sodium sulfide and potassium sulfide, and alkali sulfites such as sodium sulfite and potassium sulfite. Hydrogen peroxide may also be employed because it functions as a reducing agent in the presence of such oxidizing gases. The concentration of these reducing agents is also not critical, but may vary in general within the range from 0.1 to 10 g/l. Alkaline compounds used for the preparation of an aqueous alkaline solution or dispersion of the reducing compound may be selected from the basic compounds listed above.

The apparatus used in the practice of the invention is not critical. Most known apparatus may be preferably employed provided that a reasonable level of the gas-liquid contact efficiency is ensured.

By the process of the invention, the content of nitrogen oxides in waste gases, i.e. usually in the order of from hundreds of ppm to thousands of ppm, is reduced to the order of from several pm to tens of ppm, or less.

The invention is further illustrated by the following examples.

EXAMPLE 1

A scrubbing apparatus comprising two cylindrical vessels connected in series and each having an inner diameter of 5 cm was employed. The first vessel was charged with 150 ml of an aqueous solution containing 1 mole/l of sodium chlorate and 1.5 moles/l of hydrochloric acid and the second vessel was charged with 150 ml of an aqueous solution containing 10 g/l of sodium hydroxide and 300 mg/l of hydrogen peroxide. Air containing 1,000 ppm of nitrogen monoxide was passed through the first and second vessels in order at a flow rate of 460 ml/min. The total content of nitrogen oxides in the air withdrawn from the second vessel was 1 ppm.

EXAMPLE 2

The procedure of Example 1 was repeated except that 1 g/l of sodium sulfite was employed in substitution for 300 mg/l of hydrogen peroxide. All other conditions remained the same. The total content of nitrogen oxides in the gas withdrawn from the second vessel was 1 ppm.

EXAMPLE 3

The procedure of Example 1 was repeated except that 1 g/l of sodium sulfide was employed in substitution for 300 mg/l of hydrogen peroxide. All other conditions remained substantially the same. The total content of nitrogen oxides in the gas withdrawn from the second vessel was 10 ppm.

EXAMPLE 4

The procedure of Example 1 was repeated except that 0.8 mole/l of hydrochloric acid was employed in substitution for 1.5 mole/l. All other conditions remained the same. The gas withdrawn from the second vessel contained 0 ppm of nitrogen monoxide and 18 ppm of nitrogen dioxide.

EXAMPLE 5

A scrubbing apparatus comprising two columns, each having an inner diameter of 95 mm, connected in series and packed with Tellerette (Nittetsu Kakoki K.K., Trade mark) packings was employed. An aqueous solution containing 10 g/l of sodium chlorate and 36 g/l of hydrochloric acid and another aqueous solution containing 10 g/l of sodium hydroxide and 10 g/l of sodium sulfite were circulated through the first column and the second column respectively. Both solutions were circulated flow rate of 3.9 l/min. Air containing 1,000 ppm of nitrogen monoxide was passed through the first and second columns in order at a flow rate of 21 l/min in a counter-current manner. The gs withdrawn from the second column contained 11 ppm of nitrogen monoxide and 1 ppm of nitrogen dioxide.

EXAMPLE 6

Employing a scrubbing apparatus similar to that employed in Example 5, a flue gas from a burning process, containing approximately 2,000 ppm of nitrogen monoxide and approximately 1,200 ppm of sulfur dioxide, was treated as follows. An aqueous solution containing 1.3 g/l of sodium chlorate, 76 g/l of sulfuric acid and 4 g/l of sodium chloride, and another solution consisting entirely of water were circulated through the first and second columns respectively. Both solutions circulated at a flow rate of 3.9 l/min. The flue gas was passed through the first and second columns in order at a flow rate of 21 l/min in a counter-current manner. The treated gas withdrawn from the second column contained 10 ppm of nitrogen monoxide, 40 ppm of nitrogen dioxide and 5 ppm of sulfur dioxide.

What we claim is:

1. A process for removing nitrogen oxides from a waste gas containing the nitrogen oxides and sulfur dioxide which comprises the step of contacting said waste gas, first, at a temperature from room temperature to 80° C with an aqueous acid solution consisting essentially of at least one chlorate selected from the group consisting of sodium chlorate, potassium chlorate, ammonium chlorate, calcium chlorate and barium chlorate and 1 to 80% by weight of an inorganic acid, selected from the group consisting of nitric acid, sulfuric acid and hydrochloric acid and then, with a liquid selected from the group consisting of an aqueous solution or dispersion of a basic compound and an aqueous alkaline solution or dispersion of at least one compound selected from the group consisting of alkali metal sulfides, alkali metal sulfites and hydrogen peroxide.

2. A process according to claim 1 wherein said gaseous mixture contains nitrogen monoxide and other nitrogen oxides.

3. A process according to claim 1 wherein said chlorate is present at a concentration of 0.01 to 3.0% by weight in the acidified aqueous solution.

4. A process according to claim 1 wherein said aqueous acid solution contains 2 to 40 g/l of an alkali metal chloride.

5. A process according to claim 1 wherein said basic compound is at least one compound selected from the group consisting of sodium hydroxide, potassium hydroxide, sodium carbonate, calcium carbonate, ammonia and calcium hydroxide.

6. A process according to claim 1 wherein said basic compound is present at a concentration of 1 to 40 g/l.

7. A process according to claim 1 wherein said compound selected from alkali metal sulfides, alkali metal sulfites and hydrogen peroxide, is present at a concentration of 0.1 to 10 g/l in the aqueous alkaline solution or dispersion.

* * * * *